United States Patent [19]
Botnick

[11] 3,750,701
[45] Aug. 7, 1973

[54] SELECTABLE TEMPERATURE MIXING VALVE

[76] Inventor: Irlin Botnick, 3155 Kersdale Rd., Pepper Pike, Ohio 44124

[22] Filed: Aug. 31, 1971

[21] Appl. No.: 176,550

[52] U.S. Cl. .............................. 137/606, 137/625.4
[51] Int. Cl. ............................................ F16k 19/00
[58] Field of Search .................. 137/606, 607, 625.4

[56] References Cited
UNITED STATES PATENTS
3,348,019  10/1967  Miller et al. ................... 137/607 X
3,468,344  9/1969  Sanford .......................... 137/607 X Primary Examiner—Robert G. Nilson
Attorney—P. D. Golrick et al.

[57] ABSTRACT

A selectable temperature mixing valve delivering, from hot and cold water supplies, water at hot, cold and one or more intermediate temperatures in volume set by the degree of actuation of respective pushbutton actuated operators controlling displacement of valving members relative to inlet ports in corresponding valving sections, single ported for hot and cold delivery and double ported for mixed water in each section for intermediate temperature delivery; and in which initial intermediate temperature mixed flow is restricted at a point in the mixed flow path to ensure temperature stability with changing flow rate.

9 Claims, 6 Drawing Figures

PATENTED AUG 7 1973

INVENTOR.
IRLIN BOTNICK
BY
Ely, Golrich & Flynn
ATTORNEYS

INVENTOR.
IRLIN BOTNICK
BY
Ely, Golrick & Flynn
ATTORNEYS

SELECTABLE TEMPERATURE MIXING VALVE

Various forms of so-called mixing valves or faucets have been proposed and marketed especially for residential and like uses at kitchen sinks, lavatories, showers and similar environments to deliver water at the user's selection at the cold or hot water supply temperatures or intermediate temperatures, and at a flow rate chosen by the user.

Early mixing faucets comprised essentially hot and cold water valve structures independently operated by separate handles but jointly discharging through a common spout. Since such faucets required handle manipulation to an extent often inconvenient to obtain a desired temperature and flow rate, and readily permitted inadvertant setting to deliver water at temperatures uncomfortable if not unsafe for contact with the human body, there have been developed mixing faucets actuated by a single hand-operated knob or lever, set by one motion to select a delivered water temperature and by another motion to provide the desired flow.

Even these more recent single operator faucets have had certain untoward features. For example, except for the extreme cold or hot settings, the temperature settings are continuously variable for the intermediate temperature deliveries, — a seeming advantage, but actually for most uses and users a disadvantage to the extent that some trial and error positioning of the operator is required to obtain a particular frequently used temperature; while there is yet a notable opportunity for setting at an uncomfortable or unsafe temperature; and these untoward aspects are accentuated for a user unfamiliar with the faucet. Consequently a so-called pushbutton selection type of mixing faucets has been proposed, where a particular pushbutton or knob is actuated for each of several selectable temperatures, say cold, lukewarm, warm and hot, with at times the flow rate established by the degree of actuation.

However, not only the many forms of single actuator faucets but also the pushbutton faucets have labored under various further disadvantages of function or structure such as unreliability of settings, complexity of parts or structure leading to high manufacturing or servicing costs, undue size, short effective life, as well as others.

By the present invention there is provided a unitary mixing faucet in which the flow of water from hot and cold supply piping connections to an outlet spout or discharge piping connection is controlled at distinct valving sections, a hot section and a cold section each having a respective single inlet port, and one or more double-ported intermediate or mixing sections each controlled by a respective operator with delivery rate established by the operator setting, and with such ports as are separate for each section generally being identical to minimize the number of parts.

In selective temperature mixing valves or faucets of hitherto proposed types, wherein an operator is arranged to permit simultaneous opening of hot and cold water ports to allow a mixing flow of hot and cold water and thereby to provide a discharge of water at an intermediate temperature between the supply temperatures and with increasing operator actuation an increased discharge, it has been found at times, that in some environments of installation or conditions of operation — entirely apart from that temperature variation to be expected in most installations due to supply line "dead water" which has been environmentally warmed or chilled to temperatures other than the nominal hot and cold water supply temperatures — there is frequently a notable discharge temperature variation with valve actuation from a low flow through to a high flow point.

Though it will not be attempted to assert what is the full explanation of this problem, it seems that in some degree it is due to some flow or pressure instability originating in the valve and perhaps reflected in the lines or conversely, when both hot and cold ports are suddenly opened approximately simultaneously.

However, it has been found that by automatically initially restricting the flow from such simultaneously open ports by reducing the flow area from the nominal operating area at a point in the joint or mixed flow path down stream from the ports, at the beginning of a valve actuating motion, with a restraint to establish if only fleetingly an incipient merely "trickle" flow, and thereafter opening the flow path substantially to its full operating flow area with the total actual flow then normally controlled by the displacement of the valve member relative to the ports, an effective useful stabilization of the mixed flow discharge temperature is attained. By this expedient, from a low flow on through to a maximum high flow setting and in the reverse change of setting in practical sense very little temperature change is encountered, or in any event a temperature change so small as to be quite unobjectionable for the practical purposes for which such mixing valves are intended, for example in domestic lavatory or kitchen sinks, and even showers.

The desirability, of temperature stability throughout the flow range of a mixing valve when operated for a supposedly selected intermediate temperature, should be immediately obvious for any uses in residential, commercial, public or industrial environments, where people use the mixed flow water for washing or other purposes contacting the human body.

This aspect of a valve of the present invention of course can not ameliorate such temperature variability as might be due to dead water in the supply lines or due to marked relative changes in the supply pressures.

Also even in valve applications where body contact is not anticipated, but where a controllable rate of a mixed intermediate temperature flow of water or other liquid from hot and cold sources is used for other purposes, or where liquids of distinct characteristics, physical or compositional, are to be mixed to obtain an intermediate characteristic, a valve in accordance with the invention may at times be advantageously used, as in certain industrial environments.

Hereinafter there is described in detail a selectable temperature mixing valve embodying the above described advantageous features, in a particular form as adapted for domestic sink, lavatory or shower use, from which hot water, cold water, and the two different presettable intermediate temperatures are obtainable by operation of a corresponding operator, with the flow rate dependant upon the degree or extent of a pushbutton-like operator actuation, and in which appear other novel features, advantageous from the view points of simplicity, durability, ease of service, and as well simplicity and low cost of fabrication for the structure and functions attained.

More particularly, the valve is comprised principally of a relatively simple body casting requiring little critical machining; a simple sub-assembly insertable into the body to provide the co-operating valving members and seats; an operator support with all primary operator elements thereon as another simple sub-assembly; and an elastomeric boot or sleeve interposed as a seal and diaphragm between the body and support with the latter providing also a top or cover plate screw-secured to the body.

It is the general object then of the present invention to provide an improved mixing valve especially useful for residential and like uses.

It is another object of the present invention to provide a temperature selectable mixing valve of the general type described wherein for substantially constant supply temperatures of hot and cold water, upon operator actuation for a pre-set desired temperature, the temperature of the mixed discharge will be stabilized and substantially constant, throughout a flow range up to a maximum obtainable by setting of the operator.

Another object of the present invention is to provide a temperature selectable mixing valve delivering hot water, cold water and intermediate temperature water and having a durable and low cost construction and requiring a relatively small number of parts for the characteristics and functions achieved.

Another object is to provide a valve of the type described wherein the valving surfaces and co-operating elements are incorporated in a simple sub-assembly easily installed in the valve body.

Other objects and advantages will appear from the following description and the drawings wherein.

Figure 1:
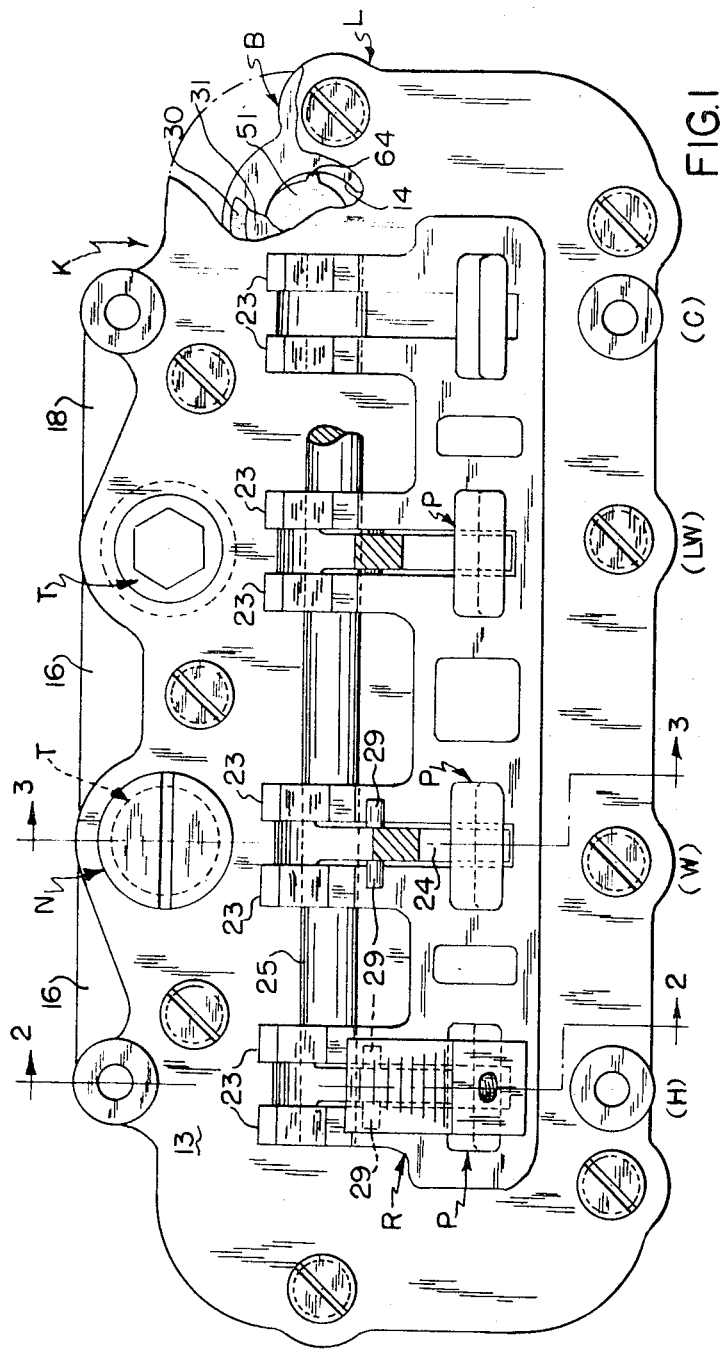
FIG. 1 shows a multiple, pushbutton operated selectable temperature mixing valve in accordance with the present invention, with certain operator elements omitted for clarity.

In the drawings the present invention is shown as embodied in a selectable temperature mixing valve whereby from hot and cold water supply lines of respective nominal temperatures there may be delivered unmixed hot water, unmixed cold water, and water of two distinct intermediate temperatures termed lukewarm and warm, each by actuation of a respective operator and at a volume rate or flow depending upon the degree of operator actuation.

GENERAL COMBINATION

As principal components the valve in the drawings comprises a hollow valve body casting B having external connection formations for piping; namely, a discharge connection from the body cavity for a spout or discharge pipe dp, and also connections for the hot and cold water supply piping sp, from which along one side wall longitudinal passages run to respective sets of three inlets opening into the cavity through and along the finished longitudinal flat vertical inside wall inlet face 11 for controlled ports to be described; temperature pre-setting metering plug valve elements T in bores intersecting the longitudinal passages; an operator support element L for parallel vertical pistons P respectively camming slide members S laterally relative to respective corresponding stemmed valving members M, contained with ported valving seat elements V, in valving chambers of a cage K which, for sealing the seats V at the respective cavity inlet areas of the inlet face, also encloses a molded unitary elastomeric gasket G; a molded elastomeric boot element E between the cavity walls and the intra-cavity portion 12 of support L as a diaphragm between the operators and discharge flow space, and top-flanged as a seal for an integral horizontal plate-like support portion 13 as a cover bolted to and closing off the body cavity open top and also securing cage K. The support L with valve section operating mechanisms including pushbutton-swung rocker arms R, pistons P and slides S; and the cage K with the valving members M, seats V and gasket G constitute two principal sub-assemblies to be brought together with the boot E and body B in final valve assembly.

Here the support element, the slides, the bodies of the intermediate section valving members, the metering valve plugs, and the cage are formed of molded plastic such as Celcon; while pistons, knobs, pushbutton pads Pp, and the operator rocker arm levers may aptly be molded plastic such as Nylon. The port or seat disks V and the valve members M or facings thereof are, for example, made of alumina as a suitable hard ceramic material.

Though body casting B, the cage K, the actuator support L, the elastomeric boot E and the seal gasket G are respective unitary structures, parts of these and of the valve as a whole are hereinafter described and spoken of in terms of four sections, that is, from the left in FIG. 1, hot (H) section, two mixing or intermediate temperature sections, namely, warm (W) and lukewarm (LW) sections, and cold (C) section, since the structures there localized control discharge of water at distinct temperatures.

BODY CASTING AND SETTING PLUGS

Figure 6:
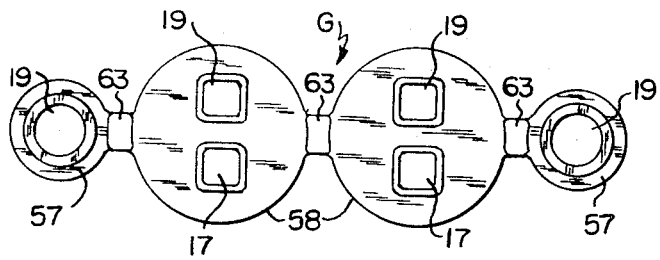

The above mentioned inlets, providing substantially equal total flow capacity to each section, open through the milled body inlet face 11 at a cage-receiving seat further defined by the flat body top surface, endwise by vertical grooves 14, and at the bottom by a milled horizontal shoulder 15 spaced below the top by the height of the cage K; and are symmetrically located on or (in the case of the intermediate temperature sections with paired ports) about a horizontal centerplane between the top and shoulder, as indicated in FIG. 6 by the positions of the correspondingly located and like-numbered port apertures of the gasket G. In one long body side, from the hot water supply connection one branching internal flow passage 16 opens to the cavity through a single inlet 17 of the hot section ported area, and also runs to the hot water inlets 17 in the ported areas in the mixing sections; while similarly from the cold water supply connection a parallel branching passage 18 opens directly to the single inlet of the cold section and then runs to the cold water inlets 19 of the two mixing sections.

To receive the respective plug T, at the vertical transverse centerplane of each mixing section, a counterbored vertical bore from the body top intersects the hot and cold water passages 16, 18, and also the respective branching inlets 17, 19 to the section. Each plug, grooved for top, bottom and intermediate O-rings sealing to the bore and defining therebetween distinct vaned valving portions, is retained by an apertured cover portion fitting on the reduced shouldered plug upper end, in which a polygonal socket may receive an adjusting tool, or as here shown, the mating shank of a removable slotted knob N for convenient adjustment manually or by a screwdriver. To afford longitudinal passage continuity, at the two inlet levels the plug is cut away to leave like, nearly sector-shaped valving vanes 20.

With the bore diameters larger than the horizontal passage widths, the bore axis offset inwardly from the center plane of the passages, and the sectors just completely angularly offset from each other, plug rotation within setting range shifts the two vanes to change the respective inlet flow areas in opposite senses, maintaining a substantially equal total inlet flow capacity to the section; while the proportion of hot to cold flow is changed by the oppositely changing extent of the inlet area occulusions. Thus the total flow area to a mixing section may be kept equal to that at the hot or cold section; and by the different settings of the two plugs, the two intermediate water temperatures are obtainable though the plugs are identical.

Figure 3:
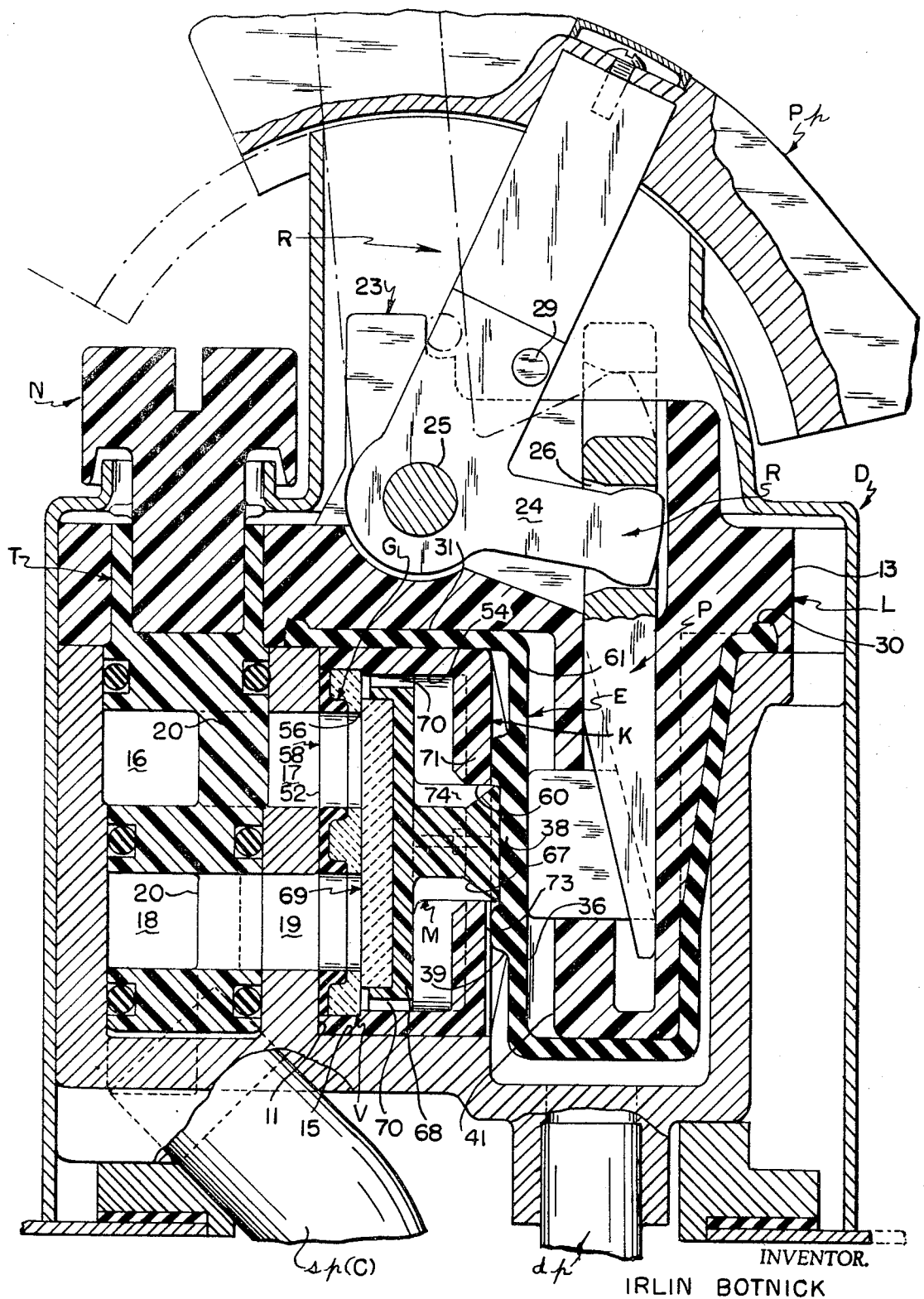
FIG. 3 is a view similar to FIG. 2 taken as indicated by the line 3—3 in FIG. 1, at an intermediate temperature controlling section of the flow valve.

On the cavity wall opposite the respective inlet regions, flat downwardly inwardly sloping surface formations 21 are provided for purposes to be described; and the top periphery has conventional external threaded apertured lugs for screws securing the cover and a decorative enclosure as at D in FIG. 3.

OPERATOR SUB-ASSEMBLY AND BOOT

The respective valving operating structures from the finger contacting pad or pushbutton Pp through to the slide member S are identical in all sections.

The support L integrally includes, as it were intersecting and projecting beyond the body cover portion 13 as well as dependent into the cavity, the elongated vertical part 12 having respective bores (here rectangular in cross-section) reciprocably supporting the four like correspondingly rectangular pistons P, each bottom end tapered for cooperatively cammingly engaging the sloped back face of a supported respective slide member S, in turn through mediation of the diaphragm provided by boot E, engaging the stem end of a respective valving member M.

Each slide member S, rectangular in cross-section, is slideably guided in a correspondingly shaped aperture as a slideway at right angles intersecting the vertical piston bore; for each piston the support L also mounts a respective piston shifting rocker arm type lever structure R pivotally supported by integral top formations 23 defining a guide slot for a lower arm 24 of the rocker; the rockers being pivoted on a common pivot shaft 25 through these several top formations. An opening 26 in the piston projecting top end receives a rounded end enlargement of the lower arm. The rocker upper arm 27 includes a removable snap-on finger contact pad Pp of pushbutton-like form, which moved forward and backwardly, to the left and to the right in FIG. 3, raises and depresses the piston respectively to turn the water flow from the section on or off; lateral integral pin formations 29 on the upper arm being engageable with top formations of the support as stop means.

The boot member E is of any appropriate water impermeable and durable elastomeric material of suitable hardness, for which many are now well known to the art, such as a Buna-n or a Neoprene.

Within the locus of cover screw apertures, the cover bottom face has a continuous closed peripheral groove receiving an upward peripheral bead 30 on boot flange 31, opposite which is a smaller casting top engaging bead 32 on the flange lower surface, which are effective to secure the clamped boot flange in a good mechanical and sealing engagement between the cover and body, as the lower bead flattened in clamping forces the top bead upwardly. In the elongated cupped or trough-like depending portion 33 of the boot as a closed sleeve surrounding the intra-cavity dependent part of the operator support and sub-assembly, a flat bottom wall and a generally vertical elongated side wall (right wall in FIGS. 2 and 3) engage or generally conform to the bottom and right side of the support; the right wall beneath the flange having outwardly convex and downwardly tapering formations 35 corresponding in slope to each body slope formation 21; while the opposite or left elongated vertical wall is offset outwardly away from its engagement with the laterally apertured side of the support, in vertical "panels" 36 of greater width than the slide members, which panels on the common level of the slides are thickened to external valving member engaging pads 37 – 38, square in outline at the two end sections and circular at the intermediate sections; the circular pads further having concentric flat-faced ring formations 39 thereon for later named functions. Otherwise generally the boot sleeve is spaced from surrounding walls.

Figure 2:
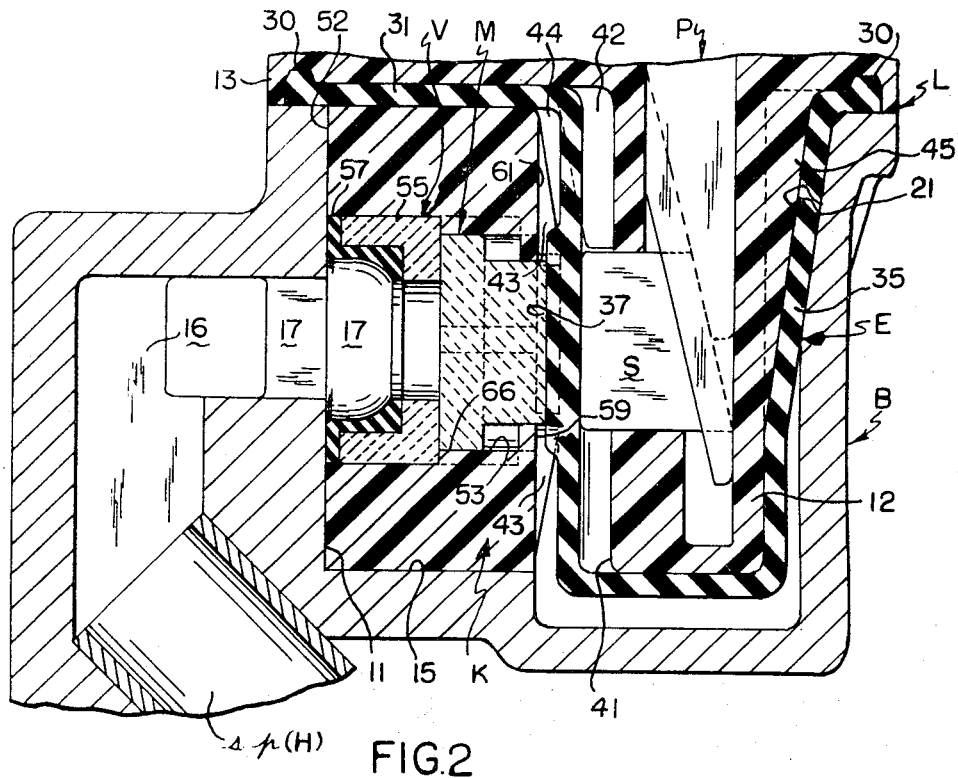
FIG. 2 is a vertical transverse section taken at the line 2—2 in FIG. 1, and showing in fragmentary form, the operative relation of elements at a hot or cold water controlling section.
Figure 5:
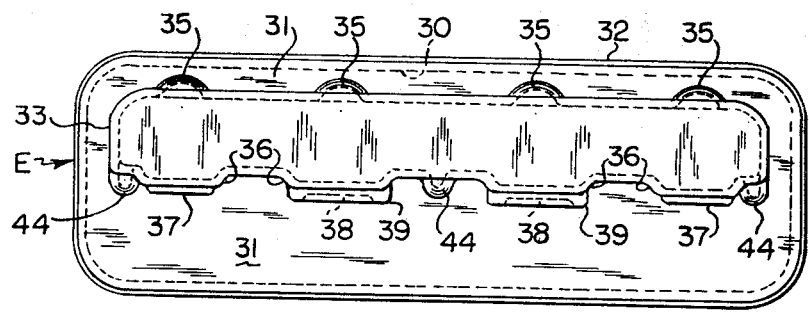
FIGS. 5 and 6 are bottom and elevational views respectively of diaphragm and gasket members.

Just beneath the support top plate portion 13, its left longitudinal vertical face 41 is provided at the end and middle regions with short downwardly diminishing tapered wedging ribs or lugs 42 which co-operate with the similarly located uppermost set of short wedging ribs 43 on the cage through the mediation of accomodating boot formations 44. These taper formations to some degree aid in locating and stabilizing the boot left vertical wall spaced between the cage and the support L, as shown in FIG. 2 and 3, to afford inward and outward flexing operating freedom as well as discharge flow space, away from any of the section outlets to the discharge outlet opening from the body casing cavity, to which the spacing between the panels 36 contributes, in addition to that on the bottom and at the other side of the boot and support.

Further, outward laterally from each piston bore and on the right support vertical face, there is an integral downwardly diminishing tapering lateral enlargement 45 in form an half-cone, merging upwardly into the top plate and downwardly terminating at a point about the opposite the slide operating center line of each respective section, the slope corresponding to the respective body sloped surface at 21, so that with a corresponding local outwardly shaped and tapered portion 35 of the boot engaged therebetween, the support is mediately braced by the casting at each section location. When the support element L is screw-secured as a valve cover plate, there is afforded a local backup or reaction support for the dependent portion 12 in each region receiving transverse thrust developed in consequence of operator closing action driving the valving members into seated relation against the respective ported areas. Moreover, by these sloping cooperating areas of engagement at each side, the depending support portion is centered.

CAGE AND VALVING ELEMENTS

The general structure and operation in the single-ported cold and hot sections are essentially the same; and so also the double-ported mixing sections are similar to each other in operation and structure. Hence, only one of each of these two types will be described.

Figure 4:
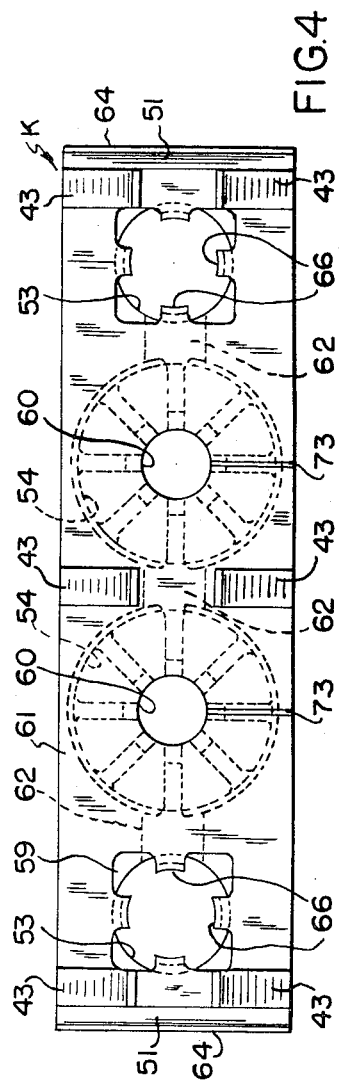
FIG. 4 is an elevational view of a valving member cage.

The cage K (FIG. 4) is molded of water resistant plastic as a generally rectangular elongated plate or block with horizontally rounded ends 51 and having in one face 52 shouldered cylindrical smaller end and larger middle recesses for respective section valving chambers 53 – 54; the cage, like the gasket G, being symmetrical about a longitudinal horizontal center plane, enabling installation in either of the respectively end-for-end inverted relative positions. For the gasket G may be used any appropriate water impermeable and durable elastomeric material of suitable hardness for which many are now well known to the art, such as Buna-n or a Neoprene.

In every section recess, the primary essential valving structure is provided by a valving member M having a hrad highly finished flat face as provided by a ceramic material; a cooperating fixed round seat disk 55 or 56 (here termed a "disk," though a small hollow cylinder 55 in the single-ported hot and cold sections) or like hard material having therethrough the port or ports 17 and 19 aligned with the respective body inlets 17 and 19 and each having a highly finished working face againt which the valving member face seals; and a seal provided by a respective gasket circular section 57 or 58, received in the recess mouth over the seat, sealing the cage and seat to inlet face 11. Thus in each section, the seat element and the recess bottom apertured for a water outlet 59 or 60 through wall 61 to the body cavity, and hence ultimately to the discharge, define a chamber for the respective valving element M stemmed for guidance in and projecting from the outlet aperture formation.

On the recessed cage face symmetrical with the longitudinal center plane, shallow slots 62 connect the successively adjacent recesses to accomodate connecting links 63 between the round gasket sections; and within the circular confines of each gasket section the flow opening for each seat port is inwardly lipped flanged to conform into the rabbeted back face margins of the seat ports for the desired sealing.

For correct positioning of the port disks to the inlets and the valve members to the slides, the cage ends engage in the respective vertical grooves 14 at the opposite body ends only through contact by a vertically locating bead 64 integral on each block end 51; while at the center and just inward of opposite ends on the block face 61 there are provided three pairs of the vertically aligned integral wedge rib formations 43, rising toward the plate centerline, at which the top seat of three as previously described cooperate with ribs 42. Through the boot top flange 31 the cover plate 13 bearing against the cage top edge face clamps the cage against inlet face 11 and shoulder 15 in the body seat structure.

At each hot and cold water recess in effect there is a round bore inward from the mouth with four equi-spaced stepped bore wall lugs 66 beginning half-way down the bore to provide first the shoulder formations engaged by the seat and arcuately surfaced steps to guide and engage the axially shiftable valve member body and stem with flow spaces thereabout; and simple like ceramic valving members are used involving integral cylindrical head and stem portions. Thus water flow space is provided from the port across the face and around the edge of the valving member head and through outlet space widened between the lug formations out to the cavity space between hoot, casting body and cage.

At each mixing section recess bore 54, larger in diameter than the non-mixing sections, the shouldered mouth accommodates a seat disk 56 having like port apertures vertically spaced corresponding to the inlets, and to ensure port and inlet alignment, edge notched to engage with a locating projection at the recess shoulder; and the outlet 60 in its bottom or end wall is a short concentric cylindrical aperture serving as a guide for and cooperating with a special longitudinally grooved stem formation 67 of the valving member body for purposes hereinafter explained. The respective valving member M comprises a molded body, with a recessed head portion 68 for ceramic valving face disk 69 bonded therein, and integral with the stem slideable in, and again projecting through, the guiding aperture of the cage back wall; but the head circumference has many equi-spaced notches 70 providing flow space past the head and defining therebetween guide lugs slideable on the recess bore. A plurality of radial ribs 71 on the end wall inside face of the mixing recess, as stops for the head, maintain flow space to the outlet. However, seat members (55,56) could be durable plastic and all valve members M have ru ber seal facing disks therein after the fashion of disk 69 in the valve member head at 68.

Importantly, at each mixing section, the cage wall face 61 has a narrow shallow radial "trickle" groove or slot 73 which could be formed in ring 39 but here extending outwardly (downwardly in FIG. 3, the sole asymmetry of the cage) beyond the outer periphery of the ring formation 39 surrounding the area of boot pad contact with the respective valving stem end. The longitudinal thin webs 74 left between the stem slots as guide bearing surfaces are thinner than the trickel slot width to ensure against blockage, permitting each mixing section valve member to be rotationally free.

It will be observed in FIG. 3, showing a mixing section valving as in the closed condition, that not only is the valving member face 69 in sealing engagement with the ported area of the seal element V, thus cutting off all water flow, but also by virtue of the outward displacement of the slide member S, the respective external integral ring 39 of the diaphragm is pressed against the flat cage face 61 about the stem guiding water outlet aperture 60 of the section. This region of the elastomeric material is compressed to a fair degree holding such a seal aided in effect by the general pad thickening and the slide end overlapping slightly the location of the inner margin of the ring 39. It will also be observed that the outermost ends of the stem slots are located just slightly to the right of the cage face 61 or at least beyond the bottom of the trickle flow groove 73.

By the resilient engagement effected between the respective piston-operated slide and the valving member stem through the above-described boot pad formation, it has been found that the actuating operator system will maintain a manually effected setting including as well the closed position.

OPERATION

The pushbutton temperature selection and operation should be obvious, as giving at each actuated section a discharge flow which is dependent upon the supply line pressure displacement allowed to the valving member and slide following the receding cam slope of the raised piston. By simultaneous operation of more than one section other temperatures are available.

However, at a mixing section upon the beginning of a valve opening operation, that is, upon a slight ascension of the piston, therefore releasing somewhat slide pressure against the resilient and stressed boot material bearing on the valving member stem, a very slight opening shift under supply line pressure is permitted to the valve member, allowing a very slight initial water flow from both parts which escapes through the mixed flow path restriction at the slot; any greater flow being impeded by the contact of the ring with the opposed cage face for all other areas. Accordingly a very slight but controlled mixed initial flow, a trickle flow, is automatically established at the very begiqning of every release of the valve member from fully closed position.

Continued operator movement allows the ring to displace outwardly with recession of the slide and accordingly an increased flow ultimately determined by the final position of the valve face relative to the seat just as in a non-mixing section.

Also the arrangement allowing trickle flow from the valve chamber, hence ultimately a visible valve drop discharge calling for complete closing, ensures that there will be no hot-cold suppl by-pass at a mixing section which otherwise would result in the event that an operator is not pushed to a completely closed condition.

Thus with relative flow areas available to the hot and the cold water port at each of the two intermediate sections being proportioned by the setting of the respective metering valve plug member, and these plugs given different pre-settings, for such two distinct temperatures as may be desired, any of the four temperatures may be selected for a water delivery by actuation of the respective operator: hot, cold, and two temperature intermediate the cold water and the hot water supply temperatures, thus affording a cold, lukewarm, warm, and hot water choice availability with the valve of this type, with flow determined by the extent of actuation of the selected operator.

In assembly, after brazing in supply and sicharge piping elements where brazed connections are used, the setting plugs with O-rings are inserted in their bores. The pistons are inserted in the support, then the rocker arms engaged therewith are secured by insertion of the pivot shaft. Thereafter the slides are inserted in their support apertures to complete a sub-assembly, to which may immediately be applied the boot then serving to retain the slides. The valving members, seat disks and gasket having been installed in the cage, the latter as a sub-sssembly is located in its body cavity seat structure, and the support-borne sub-assembly with boot is installed, and screw-secured to the body locating the various elements by the structure previously described and securing the plugs. The knobs for the latter is used and the pushbuttons are usually applied after the valve as a whole is installed in its use location, since generally a decorative housing and bracket are then assembled, through apertures of which the upper arms of the rockers and the knobs extend, so that the buttons on knobs are then finally assembled.

Obviously if more or less than two intermediate temperatures are to be available either a single intermediate section or more than two such sections would be incorporated with apporpriate changes including a changed number of plug members; or the valve may be modified to delive only one or neither supply temperature but with a plurality of distinct intermediate temperatures.

For the purposes achieved only a relatively simple, say brass, casting is required for a valve in accordance with the invention, with at most simple machining operations to be carried out, and those only on the casting, namely for the external piping connections, either sizing for brazed connections or by threading, and for sizing the plug receiving bores; a simple milling of the inlet face, the bottom shoulder and the end grooves for the cage seat in the cavity in one operation; milling the top surface of the body casting; drilling or threading of casting lug apertures for the support securing screws and mounting screws; possibly machining mounting bracket engagements; and if desired to simplify the coring required in the production of the casting, boring of the long internal passages with corresponding threading and plugging.

The valve here described obviously is adapted for use in many environments, with appropriate casing or supporting structures. The supply connection points and discharge points may be otherwise arranged, though here shown as on the casting bottom as is particularly suitable for valve mounting entirely atop a sink with flexible piping carried through a hollow stem of a support bracket, or a casing hollow stem penetrating the sink top. The valve is readily adjusted or serviced, should need arise, by virtue of the disclosed structure and sub-assemblies.

I claim:

1. A valving arrangement for stabilizing and controlling the flow of water from hot and cold water passages respectively to a mixed flow path providing a water discharge at a temperature intermediate that of the supplied cold and hot water, in a discharge rate varied in a response to the setting of a single valve operator moved from a valve closed position to a full valve open position, comprising:

a controlled hot water port and a controlled cold water port respectively opening to a said mixed flow path, valve operator means moveable between valve closed and valve open positions, valving means moveable relative to said ports between a position closing said ports and a full open position and simultaneously opening and increasing the opening of said ports in response to movement of said operator means, means downstream of said ports on the mixed flow path and controlled by said valve operator means reducing the flow area of the mixed flow path to a trickle flow area when the valve operator is in full closed position and maintaining said reduced flow area upon an initial slight valve opening movement of said operator means as said valve operator opens both said ports for an initial trickle flow through said reduced area, and thereupon with further operator motion opens said mixed flow path to tis normal operating maximum flow area, whereby the flow of hot and a cold water from respective ports is stabilized in relative flow ratio and hence in a temperature of mixed flow discharge with increasing total discharge flow and any subsequent return to a decreased flow by corresponding operator displacement.

2. A valving arrangement as described in claim 1 wherein:

said ports open through adjacent valve seat areas in a valving chamber as the beginning of the mixed flow path, said valving means including a valving member having a surface shiftable from and toward both said ports simultaneously and providing an increase in the flow as the member moves away from said ports, said valve member on the side opposite the port sealing face having a stem extending longitudinally of said chamber and through a guide aperture in a valving chamber end wall, the said stem longitudinally recessed leaving water flow space from one side to the other of said end wall at said aperture as a water outlet from the valving chamber, said operator means including a slide member bearing against the projecting end of said stem mediately through an elastomeric diaphragm portion engaged therebetween, said diaphragm having an integral annular formation facing said end wall radially spaced from said stem and adapted to make sealing contact with the outer wall face when the valve member, slide member and valve actuator are in full closed position.

a narrow shallow groove running in said outer face radially outwardly from said aperture beyond said annular formation thereby to afford said restriction in the mixed flow path, said formation and elastomeric diaphragm portion structured to maintain said sealing contact restricting the mixed flow to the area of said groove through an initial slight valve opening movement of said slide member away from the wall face to permit a slight simultaneous initial opening of both said ports with flow therefrom, and thereafter, with the continuing operator slide member opening motion, retracted with the said slide and valve members away from said wall to remove said flow restirction.

3. A mixing type water valve for controlled volume delivery selectively of hot water and cold water at respective supply temperatures and mixed water at at least one pre-set intermediate temperature, comprising:

a hollow casing including an open-topped hollow body having a cavity with a discharge and a cover member secured to and closing the body top, said body having cold and hot water supply-connected passages opening into the body cavity as a cavity longitudinal inlet face respectively through at least two lateral cold inlets and through at least two lateral hot water inlets, said inlets disposed with a first hot inlet and a first cold inlet as paired inlets closely associated in opening through the inlet face for a double ported area of a mixed flow intermediate temperature valve section, a second hot inlet and a second cold inlet opening through the inlet face at locations longitudinally spaced from each other and from the pair inlet location for single ported areas of respective hot and cold valve sections, said lateral inlet face and an associated shoulder forming a seat in the cavity;

said top providing operator support means extending into the body cavity;

cage block means having, opening in one longitudinal b ock face, a recess aligned with the double ported area and recesses aligned respectively with said single ported areas forming respective valving chambers gasketed to the said areas and having outlet openings in the opposite longitudinal block face, an axially moveable valving member in each chamber having a stem projecting from the respective outlet and having a face shiftable toward and away from the respective port area in valving section closing and opening action, said cage and with the valving members therein forming a sub-assembly;

an elastic resilient fluid-impervious diaphragm member surrounding said support means within and sealed to the body to define fluid flow space within the cavity between said outlets of the cage and said discharge and to seal said support means off from water in the valve;

said cage and said support means having cooperating surfaces engageable mediately through said diaphragm member to secure said cage sub-assembly in said seat upon securement of said top to the body;

respective valve operating means controlling the valving members for controlled delivery of hot water, for controlled delivery of cold water, and for controlled delivery of mixed hot and cold water as intermediate temperature water, from respective valving sections, each said valve operating means including a slide movable in a slideway aperture in said support means in one direction to communicate motion and force through said diaphragm to the stem of the respective movable member to move the latter toward and hold it in valve closed position against fluid pressure at the respective port area and moveable in the opposite direction for valve opening.

4. A valve as described in claim 3, wherein:

each said recess has a shouldered mouth at said one block face, and the cage sub-assembly includes respective shoulder-supported hard disk elements within the mouths and apertured for the respective inlets each as a ported chamber end wall surface-finished highly flat and smooth, and each said moveable valving member is provided with a face element of hard material disposed toward the respective said disk and surface-finished highly flat and smooth.

5. A valve as described in claim 4, wherein:

said elements are comprised of a hard ceramic material.

6. A valve as described in claim 3, wherein:

said support is integrally formed on, and depends into the body cavity from the innerside of, said cover member;

said support having for said slides respective said slideways opening through one side toward and in alignment with respective valving member stems, and bores intersecting the respective slideways and opening through the cover, and receiving respective pistons cammingly cooperatively engaging the slides;

said diaphragm member comprising an elastomeric member having a hollow body portion surrounding the depending said support and having a peripherally continous laterally flanged portion sealingly engaged between the cover and the casing body;

each said piston member moveable in its bore for camming the respective slide outwardly against the diaphragm thereby to move the respective valving member toward closed position.

7. A valve as described in claim 3, wherein:

said passages, at locations immediately before said paired inlets, are intersected by a plug-receiving bore, and a plug in the latter bore to form flow throttling intermediate temperature regulating adjustable valve means, said plug having formed therein vaned portions simultaneous changing in opposite sneses the effective flow areas to the paired inlets upon plug rotational adjustment.

8. A valve as described in claim 3, wherein:

said diaphragm member includes a respective integrally thickened external pad region between each slide and the stem of the opposed valving member.

9. A valve as described in claim 8, wherein:

the pad at the mixing section of the valve bears an integral ring formation concentrically spaced from the stem of the respective valve member and, when the valving member is in closed position, making a sealing contact with the adjacent second said block face around a respective cage chamber outlet aperture serving also as a guide for the last said stem, a shallow narrow slot in the second said block face running from said outlet out under and beyond the ring formation permitting a slight flow during said sealing contact, and said ring formation maintaining said contact upon initial valving member opening for a slight mixed flow.

* * * * *

PO-1050
(5/69)

UNITED STATES PATENT OFFICE
CERTIFICATE OF CORRECTION

Patent No. __3,750,701__ Dated __Issued: August 7, 1973__

Inventor(s) __IRLIN BOTNICK__

It is certified that error appears in the above-identified patent and that said Letters Patent are hereby corrected as shown below:

Col. 3, line 60, "connection from" should read --connection port (10) from--.

Col. 7, line 26, "disk 55 or 56" should read --disk V,55 or V,56--;
line 42, "recessed cage face symmetrical with the" should read --recessed face of the cage and symmetrical with its--;
line 52, for "vertically" read --vertical--.

Col. 8, line 5, after "portions. Thus" should read --portions 69a, 67a. Thus--;
lines 9-10, "hoot, casting body and cage." should read --boot E, casting body B and cage K.--;
line 34, "therein" should read --thereon--.

Col. 11, line 1, "tis" should read --its--;
lines 65-66, "double ported" should read --double-ported--.

Col. 12, line 3, "pair" should read --paired--;
same line, "single ported" should read --single-ported--;
line 10, "b ock" should read --block--;
same line, "double ported" should read --double-ported--;
lines 11-12, "single ported" should read --single-ported--.

Col. 13, line 20, "flow throttling" should read --flow throttling--;
line 23, "sneses" should read --senses--.

Col. 14, line 8, "pad at" should read --pad region at--.

Signed and sealed this 17th day of September 1974.

(SEAL)
Attest:

McCOY M. GIBSON JR.
Attesting Officer

C. MARSHALL DANN
Commissioner of Patents